United States Patent Office 3,471,140
Patented Oct. 7, 1969

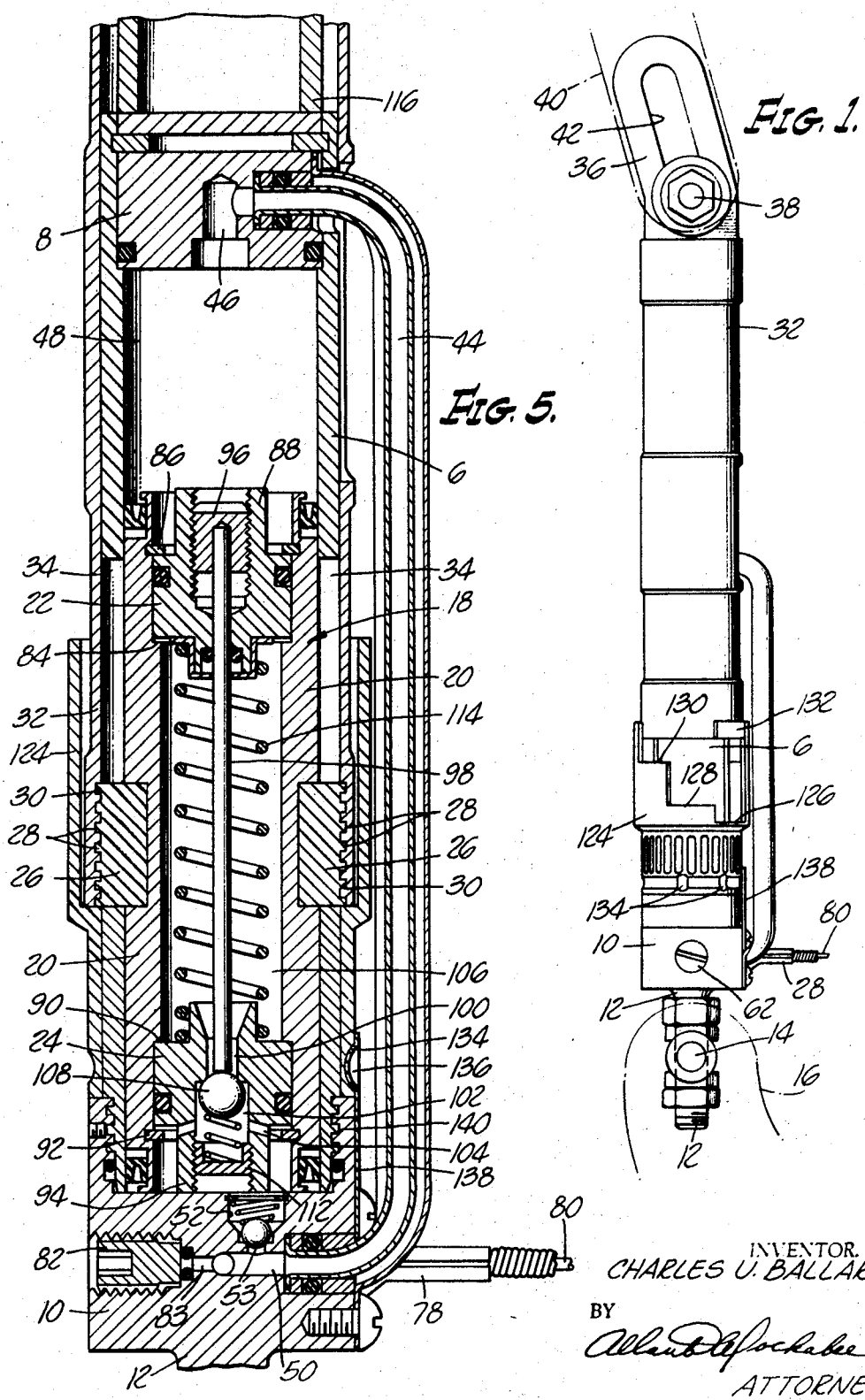

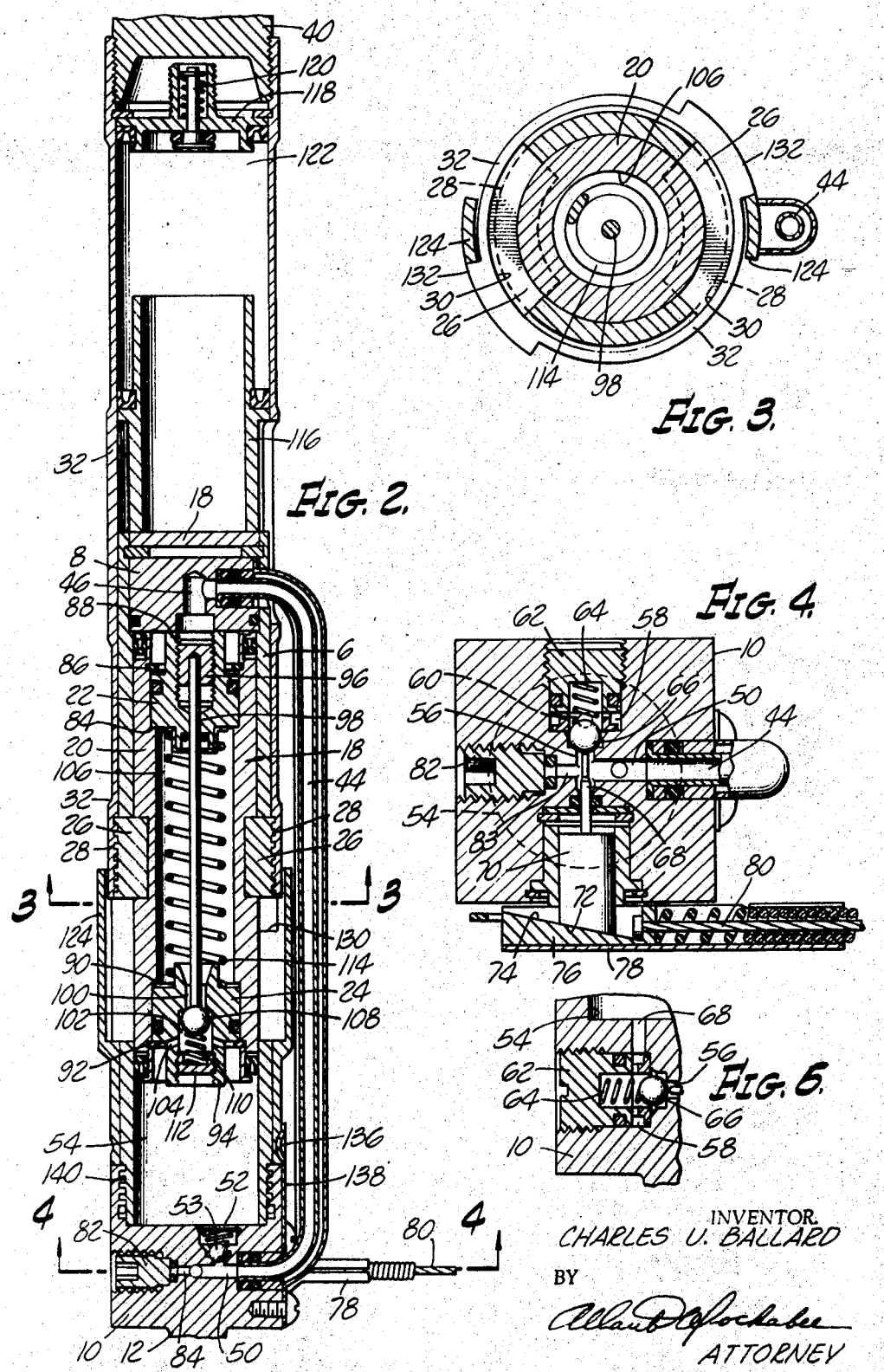

3,471,140
HYDRAULIC LOCK FOR ADJUSTABLE SEATS
Charles U. Ballard, 4253 W. Lennox,
Inglewood, Calif. 90304
Filed July 27, 1967, Ser. No. 656,475
Int. Cl. F16f 5/00; F16d 57/00; B60n 1/06
U.S. Cl. 267—1                                8 Claims

ABSTRACT OF THE DISCLOSURE

A piston and cylinder unit, one use of which is to releasably lock a reclining seat back in different angular positions, wherein the unit includes a closed hydraulic circuit, the piston having opposed pressure heads in said circuit, one of the pressure heads including a valved pressure relief port or conduit communicating with a pressure relief reservoir, the piston pressure heads being yieldably biased away from each other, and at least one pressure head having means for opening the pressure relief valve when the pressure heads have relative movement toward each other under excessive thermal expansion pressures existing in said closed circuit, or by mechanical movement of one piston part toward the other. In the exemplary disclosure, the piston and cylinder are connected respectively between a relatively stationary seat base and a tiltable seat back. Means is provided for releasably locking the hydraulic circuit to lock the piston and consequently the tiltable seat back in different positions.

---

This invention relates to means for locking a piston, which is otherwise axially movable in a cylinder in a closed hydraulic circuit, and means for relieving the hydraulic circuit of excessive pressures due to thermal expansion of the liquid in the circuit and thereby preventing leakage of the liquid.

More specifically, the invention is directed to a device of the type described for use as a hydraulic lock for aircraft seats wherein the seat base is relatively stationary and the seat back is tiltable relative to the base, and the hydraulic mechanism is used to lock the seat back relative to the base.

Hydraulic locks for tilting aircraft seat backs are presently in use. They include a closed hydraulic circuit having a piston and cylinder unit in series therein with valve means for releasing and locking the circuit to release and lock the piston, the control means generally being remotely controlled by an actuator generally located in the arm of the aircraft seat. However, due to fluctuations in the atmospheric pressure and frequent fluctuations in temperature, peculiar to aircraft at different altitudes and different temperature zones, the liquid in the hydraulic circuit is subject to a considerable range of pressure fluctuations because of thermal expansion of the liquid in the system. If, as is customary, no means is provided for relieving this excessive pressure, the liquid will leak or escape from any one of several connections in the system and not only effect the operation of the system, but be released to portions of the interior of the cabin of the aircraft, thereby creating an undesirable condition.

It is an object of the present invention to provide a piston and cylinder unit in a closed hydraulic circuit wherein means is provided for relieving excessive pressures due mainly to thermal expansion, but also due to variations in atmospheric pressure, so that the system will not become overloaded and leakage of fluid from the system is prevented.

Another object of the invention is to provide a piston and cylinder unit in a hydraulic circuit which is particularly adaptable for use in connection with aircraft seats having tilting backs wherein the system is maintained full so that the seat back will be firmly held in different positions of adjustment.

Another object of the invention is to provide a system of the type described wherein the system has a pressure relief reservoir yieldably closed by a valve which is actuated by a movable portion of the piston assembly.

Still a further object of the invention is to provide a device of the class described wherein the piston assembly defines the pressure relief reservoir.

Still another object of the invention is to provide a device wherein the piston is yieldably biased in one direction to provide for return of an element, such as a tilting seat back, to a predetermined position when the hydraulic system is opened and the piston permitted to move.

Still a further object of the invention is to provide a device of this type wherein there is an adjustable abutment means which, when moved from one position to another, will vary the limit of movement of the piston in the cylinder.

The above and other objects of the invention will more fully appear from the following description in connection with the accompanying drawings:

FIG. 1 is a side elevational view of an embodiment of the invention showing portions of a seat base and back brackets in broken lines;

FIG. 2 is an enlarged vertical sectional view through the device of FIG. 1;

FIG. 3 is an enlarged sectional view taken approximately on the line 3—3 of FIG. 2;

FIG. 4 is an enlarged sectional view taken approximately on the line 4—4 of FIG. 2;

FIG. 5 is an enlarged longitudinal sectional view showing the piston assembly in its opposite limit of movement relative to that shown in FIG. 2.

FIG. 6 is a transverse sectional detail of a portion of the lower cylinder head.

The drawings show a cylinder 6 having an upper head 8 and a lower head 10, the latter having a downward extension 12 connected by a suitable pivot means 14 to a bracket 16, the bracket being adapted for connection with the relatively stationary base of an aircraft seat. The details of the bracket and seat are not shown since they are conventional.

In the cylinder 6 is a piston assembly 18 generally comprising a sleeve 20 and piston heads 22 and 24. In opposite side wall portions of the sleeve 20 are removable inserts 26 having externally arcuate ridges 28 fitting in complementary grooves 30 in an outer sleeve-like member 32 which lies externally of the cylinder 6. Said cylinder 6 is provided with slots 34 in opposite side wall portions thereof. The blocks or keys 26 extend outwardly through the slots 34, and said slots are of such a length that they permit the blocks 26 and the piston 18 to move axially of the cylinder from the position of FIG. 2 to the position of FIG. 5.

The sleeve-like member 32 connected to the piston sleeve 20 by the blocks 26 has a connector 36 extending from its upper end, as shown in FIG. 1, and is connected by means, such as a bolt 38, to a bracket 40, said bracket being secured to a tilting seat back. The seat back and the complete bracket are not shown since the construction is well known in the art. The connector 36 is provided with a slot 42 to provide for adjustable connection of said connector 36 with the bracket 40.

A conduit 44 has one end anchored in the upper piston head 18 where it communicates with a port 46, said port being in flow communication with a cylinder chamber 48 above the piston head 22. The conduit 44 at its lower end extends into the cylinder head 10 and is connected by ports 50 and 52 to a cylinder chamber 54 below the lower piston head 24. Thus, the cylinder and piston assembly is connected in a closed hydraulic circuit normally filled with a suitable pressure transmitting liquid. It should be noted that the circuit provided by the port 52 is a unidirectional circuit permitting flow from the upper cylinder chamber 48 through the conduit 44 to the lower cylinder chamber 54. This unidirectional flow is provided by a spring pressed ball valve 53, shown in FIGS. 2 and 5.

The port 50 also is shown to be in communication through a branch port 56 with a chamber 58 having a port 60 connecting with the lower cylinder chamber 54. The chamber 58 has a plug 62 threaded therein, said plug being socketed to receive a compression spring 64 bearing against a ball valve 66 which yieldably closes the port 56. When the ball 66 is unseated, flow is provided from the lower cylinder chamber 54 through the conduit 44 to the upper cylinder chamber 48.

The ball valve 66 can be unseated by an operating pin 68 on a sliding plug 70 having a slanted end 72 which bears against a slanted face 74 on a sliding cam 76, said cam being mounted in a suitable guide 78 and being connected to an operating cable 80 leading to a suitable control station, such as a button or lever on the arm of an aircraft seat as is well known in the art.

A plug 82 is removably threaded into the enlarged end of a filler port 83 communicating with ports 50 and 56, so that the system can be filled with liquid in a convenient manner.

The upper piston head 22 is movable relative to the piston sleeve 20 a short distance determined by a shoulder 84 formed in the piston sleeve 20 and a lock ring 86 at the opposite end of the piston head. The piston head 22 also has an extension 88 which in the upper position of FIG. 2 bears against the upper cylinder head 8.

The lower piston head 24 is also slightly movable relative to the piston sleeve 20 between a shoulder 90 formed in said piston sleeve and a locking ring 92 removably mounted in said sleeve. The lower piston head 24 has a downward extension 94 which is adapted to bear against the lower cylinder head 10 in the piston position of FIG. 5.

Supported in a threaded and axially adjustable plug 96 in the upper piston head 22 is a rod 98 which extends downwardly through a port 100 which is in communication with a valve chamber 102 provided with ports 104 to permit fluid flow from the lower cylinder chamber 54 to a thermal expansion reservoir 106 in the piston sleeve 20 and between the piston heads 22 and 24. When the liquid in the fluid system increases beyond a desired predetermined pressure, primarily due to thermal expansion, one of the piston heads 22 or 24 will move toward the other causing the rod 98 to move and unseat a ball valve 108 against the pressure of a spring 110 held in place by a threaded plug 112 carried in the lower extension 94 of the piston head 24, and thereby relieving the excessive pressure by permitting part of the fluid to flow into the piston pressure relief reservoir 106.

In the piston position of FIG. 5, the lower piston head 24 has its lower extension 94 engaging the cylinder head 10, and said lower piston head 24 is also in engagement with the shoulder 90 in the lower portion of the piston sleeve 20. When thermal expansion exists with the piston in this position, there can of course be no relative movement of the lower piston head 24. However, the upper piston head 22 is urged by an expansion spring 114 in abutment with the locking ring 86 so that there is a space between the bottom of the piston head 22 and the piston sleeve shoulder 84. Consequently, when thermal expansion occurs, with the piston in the downward position of FIG. 5, the upper piston head will move downwardly until it engages the shoulder 84. Its downward movement will move the valve operating rod 98 downwardly and unseat the pressure relief ball valve 108 permitting liquid from the closed circuit to escape into the pressure relief reservoir 106.

When the piston assembly is in the upper position of FIG. 2, the upper piston head has its upper extension 88 abutting the upper cylinder head 8, and the upper piston sleeve shoulder 84 abuts the lower portion of said upper piston head 22. However, the lower piston head 24 is yieldably held in engagement with its cooperating locking ring 92 so that when thermal expansion of the liquid occurs, the lower piston head 24 can move a short distance upwardly until it engages its piston sleeve shoulder 90. This movement will likewise unseat the pressure relief ball valve 108 and permit liquid flow into the pressure relief reservoir 106.

The relief of excessive pressure due to thermal expansion relieves strain on the various packings and joints of the liquid system so that there will be no undesirable leakage from the unit, and when the excessive pressure has been relieved, the expansion spring 114 will move the piston heads away from each other slightly and permit the pressure relief ball valve 108 to again close and the system will be at its normal operating pressure which, in a static position of the parts is zero.

Extending upwardly from the upper end of the cylinder 6, is a sleeve 116 having a closed end 118 relative to which the outer sleeve 32, connected to the piston assembly 18, is slidable. The upper portion of the sleeve 32 is closed by a head 118 having a one-way spring pressed valve 120 mounted therein, said valve being provided to admit air under pressure into a compression chamber 122. When the piston assembly 18 and its connected sleeve 32 are moved downwardly by backward pressure on the back of the aircraft seat, the air in the chamber 122 will be further compressed. When the ball valve 66 is opened by the cam actuated pin 68 through operation of the flexible cable 80, the compressed air in the chamber 122 will force the piston assembly again upwardly and return the back forwardly toward its upright position. It should be noted that a mechanical spring device can be used in place of the compression chamber 122 if desired.

Mounted on the lower portion of the cylinder 6 is a sleeve 124 having stepped abutments 128 and 130 which lie in the path of movement of a stop lug 132 on the lower end of the piston connected sleeve 32. In the position shown in FIG. 1, the stop plug 132, upon downward movement of the piston assembly and sleeve 32, will continue until the lower abutment 120 is encountered. However, the sleeve 124 can be turned to bring the intermediate abutment 128 beneath the stop lug 132 or turned still further in a clockwise direction to bring the upper abutment 130 into such position. The various rotary positions of the sleeve 124 are yieldably fixed by detents 134 adapted to receive the inwardly compressed end 136 of a leaf spring 138 mounted on the lower piston head 10.

These adjusted limits of downward movement of the piston assembly 18 and sleeve 32 are provided for the reason that aircraft seats in different cabin classes have different limits of backward tilt. It is necessitated by the fact that the first class cabin seats are more greatly spaced fore and aft and their backs can tilt to the limit provided by the abutment 126 on the sleeve 124. Intermediate classes have seats more closely spaced longitudinally of the cabin and their limit of backward tilt would be determined by rotating the sleeve 124 clockwise to bring the intermediate abutment 128 in the path of movement of the stop lug 132. Finally, the seats of the lowest class cabin portion have the least amount of rearward tilting space so that the abutment 130 would be brought into the path of movement of the stop lug 132.

The lock joint 140 shown connecting the cylinder 6 with the lower cylinder head 10 is similar in construction to that provided in connection with the lugs 26 which connect the piston sleeve 20 with the outer sleeve 32, the exception being that there is no separate lug but the lands and grooves are similar to the lands 28 and grooves 30 on lugs 26 and sleeve 32. These connections are extremely strong and at the same time are compact and economical to manufacture. The spring 55, ball valve 53 and port 52 are provided to permit the seat back to be swung to a forward upright position by an air line employee when the seat is unoccupied. A forward pull on the seat will overcome the spring pressure on the ball 53 and permit the piston assembly to move upwardly.

The various O-rings and packings have not been pointed out in detail, but are indicated in a conventional manner.

From the foregoing it will be seen that I have provided a piston and cylinder unit which while capable of other uses is particularly adaptable for use in adjustably locking rearwardly tilting aircraft seat backs. It is compact in arrangement and nearly all of the structure can be formed from light weight materials, such as aluminum and magnesium alloys. It is one which provides a piston hydraulic lock, while at the same time it permits the bleeding off of small amounts of liquid from the closed circuit to relieve excessive pressure due to thermal expansion so that there are no unsightly leaks and the various seals and connections are relieved of damaging high pressures.

It should of course be understood that various changes can be made in the form, details, arrangement and proportions of the various parts, without departing from the spirit of the invention.

I claim:

1. A hydraulic lock for seats with adjustable reclining backs or the like, including a piston assembly and cylinder, a closed hydraulic circuit communicating with the cylinder at opposite ends of the piston assembly, said piston assembly and cylinder being arranged for connection respectively with relatively movable portions of the seat and reclining back, wherein the improvement comprises: said piston assembly having hydraulic pressure heads at opposite ends subject to hydraulic pressure in said closed circuit, a movable locking valve in said closed circuit to block and open said circuit and thereby lock and release said piston assembly in said cylinder, said piston assembly having a pressure relief reservoir associated therewith, a pressure relief flow connection from the pressure side of one of said pressure heads to said reservoir, a pressure relief valve in said flow connection, means normally biasing said pressure relief valve to a position closing said flow connection, and said pressure relief valve being movable to permit flow from said closed circuit to said reservoir responsive to excessive thermal expansion pressures in said closed circuit, and said piston comprising a pair of spaced head portions defining said pressure relief reservoir between them, a portion of at least one of said head portions being movable between limits relative to the other head portion under excessive hydraulic pressures in said closed circuit, said pressure relief flow connection being located in one of said piston heads, resilient expansible means interposed between said piston heads to move said portion of at least one of said heads toward a limit of movement away from the other piston head portion, and said portion of said piston assembly movable to operate said pressure relief valve comprising a member secured to one piston head portion and disposed to open said pressure relief valve upon relative movement of said portion of one of said piston head portions toward the other.

2. A hydraulic lock for seats with adjustable reclining backs or the like, including a piston assembly and cylinder, a closed hydraulic circuit communicating with the cylinder at opposite ends of the piston assembly, said piston assembly and cylinder being arranged for connection respectively with relatively movable portions of the seat and reclining back, wherein the improvement comprises: said piston assembly having hydraulic pressure heads at opposite ends subject to hydraulic pressure in said closed circuit, a movable locking valve in said closed circuit to block and open said circuit and thereby lock and release said piston assembly in said cylinder, said piston assembly having a pressure relief reservoir associated therewith, a pressure relief flow connection from the pressure side of one of said pressure heads to said reservoir, a pressure relief valve in said flow connection, means normally biasing said pressure relief valve to a position closing said flow connection, and said pressure relief valve being movable to permit flow from said closed circuit to said reservoir responsive to excessive thermal expansion pressures in said closed circuit, and each of said piston assembly pressure heads having a movable portion, and each movable portion being associated with said pressure relief valve to open said valve upon movement of either of said movable pressure head portions under excessive thermal expansion pressures.

3. A hydraulic lock for seats with adjustable reclining backs or the like, including a piston assembly and cylinder, a closed hydraulic circuit communicating with the cylinder at opposite ends of the piston assembly, said piston assembly and cylinder being arranged for connection respectively with relatively movable portions of the seat and reclining back, wherein the improvement comprises: said piston assembly having hydraulic pressure heads at opposite ends subject to hydraulic pressure in said closed circuit, a movable locking valve in said closed circuit to block and open said circuit and thereby lock and release said piston assembly in said cylinder, said piston assembly having a pressure relief reservoir associated therewith, a pressure relief flow connection from the pressure side of one of said pressure heads to said reservoir, a pressure relief valve in said flow connection, means normally biasing said pressure relief valve to a position closing said flow connection, and said pressure relief valve being movable to permit flow from said closed circuit to said reservoir responsive to excessive thermal expansion pressures in said closed circuit, and said piston assembly comprising a sleeve movable axially in said cylinder, and a pressure head at each end of the sleeve and defining, with said sleeve, said pressure relief reservoir.

4. A hydraulic lock for seats with adjustable reclining backs or the like, including a piston assembly and cylinder, a closed hydraulic circuit communicating with the cylinder at opposite ends of the piston assembly, said piston assembly and cylinder being arranged for connection respectively with relatively movable portions of the seat and reclining back, wherein the improvement comprises: said piston assembly having hydraulic pressure heads at opposite ends subject to hydraulic pressure in said closed circuit, a movable locking valve in said closed circuit to block and open said circuit and thereby lock and release said piston assembly in said cylinder, said piston assembly having a pressure relief reservoir associated therewith, a pressure relief flow connection from the pressure side of one of said pressure heads to said reservoir, a pressure relief valve in said flow connection, means normally biasing said pressure relief valve to a position closing said flow connection, and said pressure relief valve being movable to permit flow from said closed circuit to said reservoir responsive to excessive thermal expansion pressures in said closed circuit, and a sleeve slidable on an end of said cylinder in sealed relation thereto and having a closed outer end defining, with said cylinder, an air compression chamber, said piston assembly pressure heads being in air sealed relationship to the inner wall of said cylinder at longitudinally spaced points, a longitudinal slot in said cylinder between said piston pressure heads, and a connection between said cylinder and said sleeve extending through said longitudinal slot in said cylinder to provide for movement of said sleeve with said cylinder.

5. A hydraulic lock for seats with adjustable reclining backs or the like, including a piston assembly and cylinder, a closed hydraulic circuit communicating with the cylinder at opposite ends of the piston assembly, said piston assembly and cylinder being arranged for connection respectively with relatively movable portions of the seat and reclining back, wherein the improvement comprises: said piston assembly having hydraulic pressure heads at opposite ends subject to hydraulic pressure in said closed circuit, a movable locking valve in said closed circuit to block and open said circuit and thereby lock and release said piston assembly in said cylinder, said piston assembly having a pressure relief reservoir associated therewith, a pressure relief flow connection from the pressure side of one of said pressure heads to said reservoir, a pressure relief valve in said flow connection, means normally biasing said pressure relief valve to a position closing said flow connection, and said pressure relief valve also being subject to closed circuit pressure urging it to a position closing said flow connection, and means subject to said closed circuit pressure and movable to open said pressure relief valve to permit flow from said closed circuit to said reservoir responsive to excessive thermal expansion pressures in said closed circuit.

6. The structure in claim 5, and an expansible air compression device connected to one of said piston assembly and cylinder for biasing the piston in one direction in said cylinder.

7. The structure in claim 5, and a sleeve slidable over an end of said cylinder in sealed relation thereto and having a closed outer end defining, with said cylinder, an air compression chamber, and said sleeve having a connection with said piston assembly to provide movement of said sleeve with said piston assembly lengthwise of said cylinder.

8. The structure in claim 5, and one end of said cylinder having an outlet port and a valve therein biased to a closed position to prevent flow thereby when rearward pressure is exerted on the seat back and to permit flow in the opposite direction when the seat back is pulled forwardly.

References Cited

UNITED STATES PATENTS

| | | | |
|---|---|---|---|
| 2,658,588 | 11/1953 | Kanuch | 188—96 |
| 3,024,067 | 3/1962 | Brandoli | 297—355 |
| 3,145,985 | 8/1964 | De Carbon | 267—64 |
| 3,051,274 | 8/1962 | Porter | 167—1 X |

FOREIGN PATENTS 554,762  7/1943  Great Britain.

GEORGE E. A. HALVOSA, Primary Examiner

U.S. Cl. X.R.

188—97, 100; 297—355